Jan. 12, 1965   C. E. JOHNSON ETAL   3,165,286
HINGED SADDLE FOR HOSE
Filed May 24, 1961
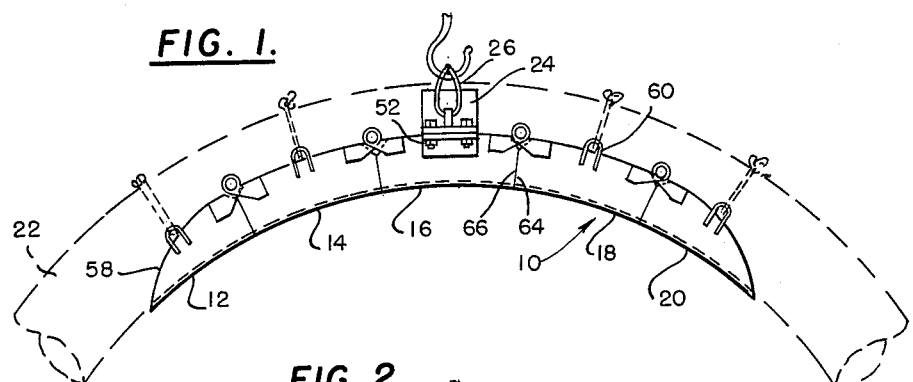
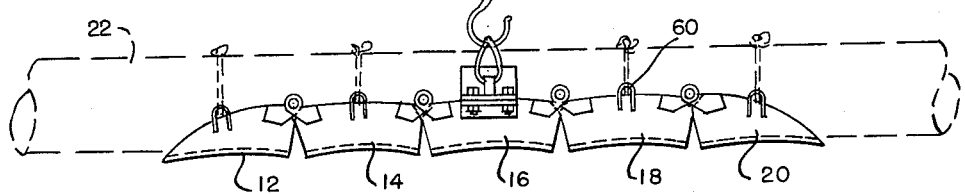
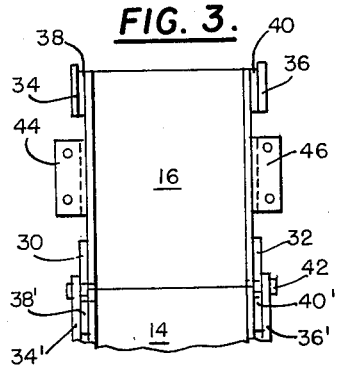
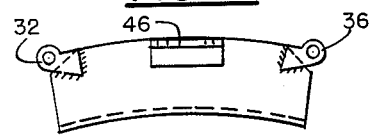
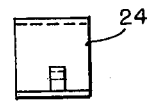
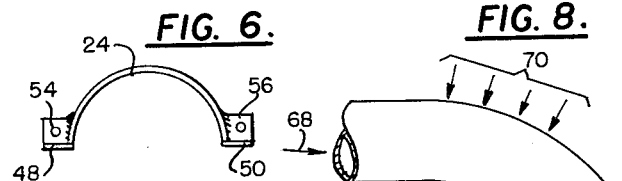
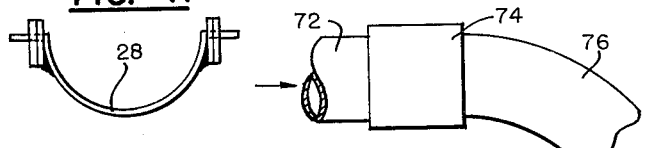
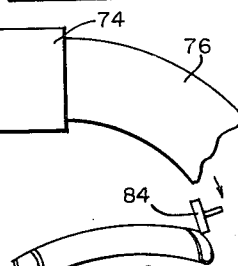
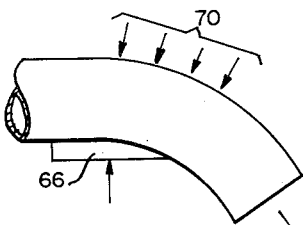
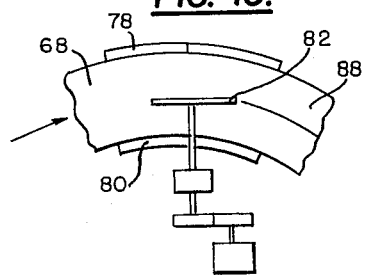
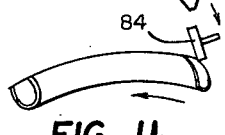
INVENTORS
Charles E. Johnson
Frank W. Packer
BY John L. Shotley
ATTORNEY United States Patent Office 3,165,286
Patented Jan. 12, 1965

3,165,286
HINGED SADDLE FOR HOSE
Charles E. Johnson, Kenmore, N.Y., and Frank W. Packer, Fort Erie, Ontario, Canada, assignors to Hewitt-Robins Incorporated, Stamford, Conn.
Filed May 24, 1961, Ser. No. 112,317
4 Claims. (Cl. 248—75)

This invention pertains to devices for supporting hose and particularly for a saddle for supporting a curved section of a hose over or under a road-way, or other obstruction. In many instances, such as at oil docks, it is desirable to utilize a rubbery hose for transporting fluids from place to place. In some cases the hoses must traverse road-ways or walks, or pass over or under machinery or other obstacles. When the hoses are connected to inlet and outlet points along the ground the hoses must be supported above such obstacles. Very often these hoses have considerable weight and they are of considerable size over-all. The over-all size makes it difficult to provide a satisfactory bridge or platform for vehicles to move over a hose simply laid in the ground. For example, the hose might be a foot in diameter. This would create quite a hump in a road-way. Accordingly, hoses temporarily positioned over a road-way are supported from slings or saddles. This invention pertains to such a saddle as well as to a method of manufacturing a saddle.

One of the objects of this invention is to provide a simple, yet strong, and otherwise satisfactory means for supporting a hose. It is known that bridges can be built to hold up a hose and temporary platforms can be placed in position. However, these often do not provide an adequate support for a hose and a hose of the sizes contemplated has considerable stress applied to it if it is not properly supported. Further, long lengths should not be allowed to rest on sharp edges, nor should the hose have abrupt bends. Accordingly, one object of the invention is to provide a saddle means which will properly support a hose. Other objects of the invention are: to provide a saddle which can be simply placed beneath the hose raised by a hoist or derrick means and which will provide a proper and adequate support for the hose and ample clearance beneath the hose, and which will facilitate the installation, use and removal of hoses. An additional object of the invention is to provide a complete saddle structure which need only be attached to the hose and does not acquire additional devices, attachments or supporting means. Yet a further object of the invention is to provide a saddle structure which can be simply and readily attached to a hoist means.

A further object of the invention is to provide a saddle structure which will completely and fully support the hose and comprises simple sections readily adapted to be applied to a hose while the hose is on the ground and which will automatically fall into the proper relationship and provide proper support upon hoisting the hose above ground. Still another object of the invention is to provide a saddle structure which is of light weight and can be readily moved to or from a place of use or storage, and otherwise manipulated by plant personnel.

A further object of the instant invention is to provide a hose sling or support that will conform to the curvature of large size hoses and still provide support and protection. Large size hoses (a foot in diameter, for example) are relatively stiff. They will readily adapt themselves to a smooth curve which has a radius adequate to prevent damage, but if improperly supported they can easily suffer permanent deformation. This is particularly apt to happen if the hoist stress is not properly spread along the hose. The instant saddle will provide complete support. The saddle will also limit the bending of a hose. Another advantage is that the instant saddle will support the hose without subjecting it to severe bending stresses at a point where the rigid support of the saddle ends. The saddle will also conform to the shape of the hose no matter what the bending radius of the hose is.

Still another object of the invention is to provide a simple method for manufacturing saddles formed to support hoses in desired curvilinear paths.

An additional object of the invention is to provide a method for forming a saddle of readily available materials.

These and other objects and advantages of the invention will become apparent from the description and the accompanying drawings wherein:

FIGURE 1 is a side elevational view of a saddle constructed in accordance with the invention and showing a hose therein and the saddle held in the air by a hoist apparatus.

FIGURE 2 is a side elevational view showing the hose and attached saddle resting on the ground.

FIGURE 3 is a top plan view of a saddle segment or section.

FIGURE 4 is an end elevational view of the latter.

FIGURE 5 is a side elevational view of the segment.

FIGURE 6 is an end view of a cap member.

FIGURE 7 is a side view of the cap member.

FIGURE 8 diagrammatically shows a first step in a method of forming a saddle in accordance with the invention.

FIGURE 9 shows an actual method involving a known type of pipe bending machine.

FIGURE 10 shows a second step.

FIGURE 11 illustrates a third step.

FIGURE 12 shows a fourth step.

Referring now in particular to the drawings: In FIGURE 1 we illustrate a saddle 10 constructed in accordance with the invention. This saddle comprises a series of segments 12, 14 and 16. The central section 16 is illustrated in greater detail in FIGURES 3 through 5. As will become apparent hereinafter, all the sections are similarly formed; in fact, one of the features of our invention is that the segments are substantially similar and can be formed from a single piece of stock. A hose 22 is supported within the saddle and in such a manner that it gently arches over a road-way or obstruction. It is apparent that a lesser number of segments may be used than that illustrated. Further, it is apparent that the curvature may be different from that illustrated. As seen in FIGURE 1 a cap segment 24 is also employed. This segment is more fully illustrated in FIGURES 6 and 7. A hoist sling 26 is used in cooperation with a hoist means (not illustrated) to raise and lower the hose and maintain it in selected positions.

FIGURES 3, 4 and 5 show the central segment 16. This comprises a plate or sheet member bent to the shape illustrated and having a hose supporting surface 28 curved about a radius selected for the particular services. At one end the segment is provided with a pair of lugs 30 and 32 attached to its side, preferably by welding. At its opposite end there is a similar pair of lugs 34 and 36. The latter two are secured to a pair of spacer blocks 38 and 40. These spacer blocks place the alignment lugs at this end outwardly sufficiently to cooperate with a pair of lugs on the next adjacent segment which corresponds to lugs 30 and 32. This is illustrated at the bottom of FIGURE 3 wherein the lugs 34' and 36' of segment 14 are shown in connection with the lugs 30 and 32 of segment 16. The alignment lugs on segment 14 are positioned alongside the lugs on segment 16 and pins 42 are used to pivotally secure the sections together. The pins 42 are held in position by cotter pins. The segment members and the spacer blocks, are cut at their ends to provide room for the pins 42 and the lugs 30, 32 respectively. The central section 16 has a pair of brackets 44 and 46 attached to its opposite sides, respectively, and each provides a flat upper surface. These are adapted to cooperate with similar brackets 48 and 50 on cap segment 24. The cap segment, it should be noted, is formed so as to be complementary to the central segment 16 and together they form a sleeve for the hose 22. The brackets 48 and 50 can be secured to the brackets 44 and 46 by nut and bolt means 52. Sling receiving plates 54 and 56 are provided, and preferably they form a part of the brackets 48 and 50. Bearing segments 12 and 20 have these upper edges beveled downwardly and outwardly as indicated, at 58. This provides a smooth edge or end for the saddle; the purpose of which is to insure that the hose will not be damaged. Since the segments are interconnected by the pins 42 they form a series of pivotally interconnected members. They can be placed in association with the hose when it is on the ground or other surface. Thereafter by use of a sling 26 the entire assemblage can be raised. During the raising the saddle sections will pivot under the load of the hose and assume an arc. This movement will be in conformity with the movement of the hose, but the maximum bend will be limited by the saddle.

It is sometimes preferred to attach each segment to the hose. This can be accomplished by providing each segment with U-bolt like tie members 60. These comprise U-bolts welded to the segments. Rope or cable may be passed through the opposed tie members and tied together at its ends so as to accomplish a more secure connection. The segments of the saddle are so pivotally interconnected that they will abut when they reach a pre-determined arc such as illustrated in FIGURE 1. Thus the edge 64 will abut edge 66 and these edges constitute abutment and limiting means.

In FIGURE 8 we illustrate schematically a method of forming a saddle constructed in accordance with the invention. According to the method we have devised a piece of plain iron pipe of a size selected in accordance with the hose with which the saddle will be used is placed on a table 66. The pipe is moved over the table in a direction indicated by the arrow 68 while pressure is applied along its upper surface as indicated by the arrows 70. As a result the pipe, due to the curvature of the table and the manner in which the pressure is applied to the upper surface of the pipe is deformed or bent into an arcuate shape. The curvature is governed by the shape of the table. It is well known that there are many machines and methods for bending pipe and FIGURE 9 schematically illustrates pipe 72 being advanced through a pipe bending machine 74 and emerging in a curved form 76. In FIGURE 10 we show the previously bent pipe 68 being advanced over a table between guides such as 78 and 80, beneath a saw 82, applied in such a manner as to cut the wall of the pipe, tangentially thereof. Once the pipe is cut on one side it is reversed and passed backwards again beneath the saw so as to cut the other side. It will occur to many that the machines illustrated are well known and readily available. Further, other means of cutting the pipe 68 in half will be apparent to those skilled in the art once they are perused this specification. The result of this is to obtain two halves of bent pipe, one of which is an upwardly opening curvilinear hose receiving member, and the other a downwardly facing member. FIGURE 11 illustrates a further manipulation or operation on the upwardly facing half piece of pipe, namely that of beveling the edges, such as 58 (see FIGURE 1). This can be accomplished by another saw and proper manipulation of the saw relative the work supporting table. FIGURE 12 shows another step; i.e., that of cutting the pipe half into segments. As indicated above, it should be noted that flame cutting or other means can be employed in place of the saws 82, 84 and 86. It should also be noted that the opposite member 88 may be likewise beveled and cut into sections and formed into a saddle for supporting a hose in an upwardly facing arc. Further, it should be apparent that beveling can be dispensed with if desired. Lugs and spacing blocks are attached after the cutting operations are completed. The U-bolt tie members are also attached after the cutting is complete. It should be further apparent that the sections may then be pinned together. The saddle cap segment 24 can be cut out of a straight pipe section or it can be cut out of the reverse section, or cap sections for both upper and lower arch hose saddle devices can be cut out from the ends of the pipe either before or after bending.

From the above it will be apparent that we have provided a hose saddle which will adequately support relatively heavy weight hoses capable of carrying large quantities of fluids without damage to the hoses. The saddle is fool-proof; having relatively few parts and little chance of going out of adjustment. The saddle is simply and readily attached to a hose, and a simple means for lifting the saddle is provided. Further, the method of manufacturing which we have devised produces the saddle in a most efficient and expeditious manner.

Although we have shown preferred forms of our invention, it will be apparent to those skilled in the art that many changes may be made and accordingly we claim an exclusive right to all forms or modifications coming within the scope of the appended claims.

The saddle sections collectively form a continuous hose supporting surface when the hose is raised. However, they are movably connected to each other and will conform to and adjust to the bending of the hose as it is raised or lowered, and thus the hose will not be strained by the saddle itself. This adjustment takes place during the pivotal movement of the segments in the plane which will contain the hose. The saddle segments are of hemispherical shape in cross section laterally of the major axis of their hose supporting surfaces. The latter surfaces are curvilinear so that they will form an arc-like peripheral supporting surface for a bent or curved hose.

We claim:

1. A hose saddle comprising a plurality of segments arranged in a series to end, each segment being semicylindrical in cross-section and presenting a base arcuately curved along its length about an axis of curvature to form a supporting trough which opens outwardly of its curved length, said segments being pivotally interconnected for pivotal movement about axes extending transversely of the saddle, said segments being so pivotally interconnected as to permit said saddle to rest on a planar surface with said segments in substantial longitudinal alignment, and as to cause said segments to pivot relatively in a radial direction towards said axis of curvature from said longitudinally aligned position under the influence of a downward load applied thereto by a flexible hose supported on said saddle upon lifting of the center of the saddle upwardly out of contact wtih said supporting surface, whereby said segments conjointly form a longitudinally curved trough-like chamber opening upwardly upon said lifting operation, means for limiting the relative pivotal movements of said segments in said radial direction to a relative stopped position in which said segments conjointly form a substantially continuous longitudinally curved support for the hose, and comprising stop configurations on said segments respectively in position to come into abutting interengagement when said segments reach said relative stopped position, and means for attaching a lifting device to said saddle to apply a central lifting force thereto to lift the saddle with the hose supported thereon, so as to support a portion of the hose received in said saddle in an arc.

2. A hose saddle comprising a plurality of segments arranged in a series end to end, each segment being of trough-like shape and presenting a base curved along its length substantially about an axis of curvature to form a supporting trough which opens outwardly of its curved length, said segments being pivotally interconnected for pivotal movement about axes extending transversely of the saddle, said segments being so pivotally interconnected as to permit said saddle to rest on a planar surface with said segments in substantial longitudinal alignment, and as to cause said segments to pivot relatively in a substantially radial direction towards said axis of curvature from said longitudinally aligned position under the influence of a downward load applied thereto by a flexible hose supported on said saddle upon lifting of the saddle intermediate of its ends upwardly out of contact with said supporting surface, whereby said segments conjointly form a longitudinally curved trough-like chamber opening upwardly upon said limiting operation, means for limiting relative pivotal movements of said segments in said radial direction to a relative stopped position in which said segments conjointly form a substantially continuous longitudinally curved support for the hose, and comprising stop configurations on said segments respectively in position to come into abutting interengagement when said segments reach said relative stopped position, and means for attaching a lifting device to said saddle intermediate of its ends to lift the saddle with the hose supported thereon, so as to support a portion of the hose received in said saddle in curved position.

3. The saddle of claim 2, wherein said attaching means comprises a removable saddle cap segment cooperable with said saddle to form therewith a complete hose encircling portion along a portion of the length of said saddle.

4. The saddle of claim 2, wherein said segments are pivotally connected together near the open longitudinal sides of the segments, and said limiting means comprises the confronting end edges of adjoining segments constituting said stop configurations, each pair of confronting edges diverging from near the pivoted open sides of the corresponding segments towards the bases of the latter segments and coming into abutting interengagement in said stopped position of said segments.

References Cited in the file of this patent

UNITED STATES PATENTS

| | | |
|---|---|---|
| 1,225,243 | Hawes | May 8, 1917 |
| 1,568,931 | Thomas | Jan. 5, 1926 |
| 1,869,778 | Roberts | Aug. 2, 1932 |
| 2,177,128 | Johnson | Oct. 24, 1939 |
| 2,361,139 | White | Oct. 24, 1944 |
| 2,365,972 | Rachlin | Dec. 26, 1944 |

FOREIGN PATENTS

| | | |
|---|---|---|
| 146,768 | Germany | Dec. 16, 1903 |